United States Patent
Axelrod

(10) Patent No.: US 7,874,266 B2
(45) Date of Patent: Jan. 25, 2011

(54) BIODEGRADABLE WASTE PAD OR LITTER INCLUDING NUTRIENTS FOR PROMOTING MICROBIAL POPULATIONS

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 649 days.

(21) Appl. No.: 11/864,220

(22) Filed: Sep. 28, 2007

(65) Prior Publication Data

US 2009/0084322 A1    Apr. 2, 2009

(51) Int. Cl.
A01K 29/00    (2006.01)
(52) U.S. Cl. ........................... 119/171; 119/169
(58) Field of Classification Search ............ 119/171, 119/174, 169, 172, 173, 28.5, 526; 210/170.09, 210/205, 610, 170.08; 435/252.3, 252.5, 435/252.1, 471, 254.1
See application file for complete search history.

(56) References Cited

U.S. PATENT DOCUMENTS

| | | | | |
|---|---|---|---|---|
| 2,796,399 | A * | 6/1957 | Sanders et al. ............ | 210/608 |
| 2,835,313 | A * | 5/1958 | Dodge ........................ | 5/740 |
| 3,718,119 | A * | 2/1973 | Stevenson ................... | 119/442 |
| 4,165,281 | A * | 8/1979 | Kuriyama et al. .......... | 210/616 |
| 4,201,663 | A * | 5/1980 | Rollag et al. ............... | 422/4 |
| 4,218,233 | A * | 8/1980 | Hackett ..................... | 71/9 |
| 4,826,497 | A | 5/1989 | Marcus et al. | |
| 5,476,528 | A * | 12/1995 | Trimm et al. ................ | 71/21 |
| 5,486,292 | A * | 1/1996 | Bair et al. ................... | 210/616 |
| 5,580,770 | A * | 12/1996 | DeFilippi .................... | 435/180 |
| 5,700,687 | A * | 12/1997 | Finn ........................... | 435/266 |
| 5,819,688 | A | 10/1998 | Walker | |
| 5,861,095 | A * | 1/1999 | Vogel et al. ................. | 210/605 |
| 5,927,049 | A | 7/1999 | Simard | |
| 5,962,309 | A * | 10/1999 | Kumagai et al. ........... | 435/299.1 |
| 6,019,062 | A | 2/2000 | Lombard et al. | |
| 6,080,304 | A * | 6/2000 | Gomi .......................... | 210/94 |
| 6,086,755 | A * | 7/2000 | Tepper ........................ | 210/150 |
| 6,136,194 | A * | 10/2000 | Vogel et al. ................. | 210/605 |
| 6,218,321 | B1 | 4/2001 | Lorcks et al. | |
| 6,276,300 | B1 | 8/2001 | Lewis, II et al. | |
| 6,444,653 | B1 | 9/2002 | Huppe et al. | |
| 6,558,548 | B2 * | 5/2003 | Svirklys et al. ............. | 210/603 |
| 6,627,750 | B2 | 9/2003 | Wang | |
| 6,706,941 | B2 | 3/2004 | Hisanaka et al. | |
| 6,713,460 | B2 | 3/2004 | Huppe et al. | |
| 6,833,488 | B2 | 12/2004 | Bucevschi et al. | |
| 6,854,421 | B2 | 2/2005 | Opfel | |
| 6,868,802 | B2 | 3/2005 | McPherson et al. | |
| 6,875,357 | B1 * | 4/2005 | Mikkelson et al. ......... | 210/630 |
| 6,887,570 | B2 | 5/2005 | Greene et al. | |
| 6,932,540 | B2 * | 8/2005 | Svirklys et al. ............. | 405/52 |
| 6,976,451 | B2 | 12/2005 | Helfman | |
| 7,124,710 | B2 | 10/2006 | Weaver | |
| 7,196,022 | B2 | 3/2007 | Koenig et al. | |
| 7,331,309 | B2 | 2/2008 | Burckbuchler, Jr. | |
| 7,422,680 | B2 * | 9/2008 | Sheets, Sr. .................. | 210/143 |
| 7,429,421 | B2 | 9/2008 | Greene et al. | |
| 7,629,292 | B2 * | 12/2009 | Mann et al. ................. | 502/402 |
| 7,658,851 | B2 * | 2/2010 | Nelson et al. ............... | 210/615 |
| 2003/0054167 | A1 | 3/2003 | Wang | |
| 2003/0119396 | A1 | 6/2003 | Koenig et al. | |
| 2004/0216688 | A1 | 11/2004 | Ellis | |
| 2005/0056229 | A1 | 3/2005 | Greene et al. | |
| 2005/0075617 | A1 | 4/2005 | Vartiainen | |
| 2005/0109284 | A1 | 5/2005 | Helfman | |
| 2005/0112085 | A1 | 5/2005 | MacDonald et al. | |
| 2005/0145552 | A1 * | 7/2005 | Sheets ........................ | 210/192 |
| 2005/0160996 | A1 | 7/2005 | Weaver | |
| 2006/0169215 | A1 | 8/2006 | Burckbuchler, Jr. | |
| 2006/0201438 | A1 | 9/2006 | Anttila et al. | |
| 2006/0260559 | A1 | 11/2006 | Fry et al. | |
| 2007/0065397 | A1 | 3/2007 | Ito et al. | |
| 2007/0077428 | A1 | 4/2007 | Hamed et al. | |
| 2008/0257809 | A1 * | 10/2008 | Baskis et al. ............. | 210/195.1 |
| 2009/0321350 | A1 * | 12/2009 | Nelson et al. ............... | 210/610 |

FOREIGN PATENT DOCUMENTS

WO    2005084724 A1    9/2005

OTHER PUBLICATIONS

International Search Report and Written Opinion of the ISA; date of mailing Dec. 3, 2008; issued in corresponding International Appln. No. PCT/US08/77919.
Web search for Dog Products; "Dog Training Aids: 8in1; © 2005 Spectrum Brands, Inc." (2 pgs).

(Continued)

Primary Examiner—Yvonne R. Abbott
(74) Attorney, Agent, or Firm—Grossman, Tucker, Perreault & Pfleger, PLLC

(57) ABSTRACT

A waste absorbent material for the treatment of animal waste is provided which may comprise a non-woven pad or litter granules which include micronutrients which may stimulate specific microorganisms and reduce the gases produced by the aerobic and/or anaerobic decomposition of organic matter. The non-woven pad and/or litter may also comprise biodegradable fibers or biodegradable particulate and the micronutrients may be uniformly distributed over the pad surface or within the particulate and be incorporated at a selected thickness.

19 Claims, No Drawings

OTHER PUBLICATIONS

Web printout: "All-Natural Odor-Out BioLogic Pet Care"; Global Liquids Corp. (1 pg).

Amanda Yarnell, "Kitty Litter"; Science & Technology, Apr. 26, 2004, vol. 82, No. 17, p. 26 (2 pgs).

Web printout: OnlineCatCare.com; "Enzyme Cleaners—The Only Effective Cat Urine Oder Eliminator"; © Online Cat Care (2 pgs).

www Google search: biodegradable deodorant (4 pgs).

* cited by examiner

BIODEGRADABLE WASTE PAD OR LITTER INCLUDING NUTRIENTS FOR PROMOTING MICROBIAL POPULATIONS

FIELD

This disclosure relates to waste absorbent articles, such as pads or animal litter, and more particularly to a biodegradable pad or litter which may include nutrients to reduce the odor caused by the anaerobic decomposition of organic matter. Such nutrients may include mixtures of amino acids, vitamins and/or trace minerals suitable for growth and development of bacteria, both aerobic and/or anaerobic, for biological stabilization of waste.

BACKGROUND

Pet owners, particularly those who have domesticated dogs, must often take their pets outside so that the pet may urinate and/or defecate. This process may become difficult when the pet owner lives in a confined environment, such as crowded city areas, or lives in an environment that becomes particularly cold during the year. Additionally, the process may also become difficult when the pet owner lacks mobility or is required to be away from the pet during long portions of the day.

One of the major problems associated with most pet animals may be odors, and usually unpleasant if not obnoxious odors, which may arise from the waste products, such as urine and solid excreta, of the animal. Cats and small dogs may typically require litter boxes or absorbent pads in order to discharge urine and solid waste products. Absorbent pads may also be treated with a scent, attractive to young dogs, which may be used to train, or house break, the animal by inducing where to urinate and defecate. Degradation of the components present in such waste products (e.g., protein, fat, etc.) may generate malodorous byproducts. In addition, urine and/or other exudates usually contain microorganisms that produce the urease enzyme that is responsible for the degradation of urea present in urine to ammonia.

One type of odor absorption technology may include incorporation into the absorbent article of compounds that are known to absorb odors, such as activated carbons, clays, zeolites, silicates, cyclodextrine, ion exchange resins and various mixtures thereof. These compounds may control odor by mechanisms whereby the malodorous compounds and their precursors are physically absorbed. The compounds thereby hinder the exit of the malodorous compounds from absorbent articles. However, such mechanisms may not be completely effective because the formation of the odor itself is not prevented, and thus some odor still may be detected in the product. Also, it is believed that the odor absorbing particles lose odor-trapping efficiency when they become moist, as most absorbent articles do. Furthermore, in order for these compounds to be effective at controlling odor, a high loading of these compounds may be required which increases the cost of the absorbent article, and may tend to adversely affect the absorbency and performance of the absorbent article.

SUMMARY

In one exemplary embodiment, the present disclosure relates to an odor adsorbing pad for collecting animal waste, comprising fibers coated or impregnated with micronutrients at a level of between about 0.1% to about 25% by weight. The micronutrients are configured to promote the growth of bacteria that are capable of metabolizing waste by aerobic respiration and/or anaerobic respiration.

In a second exemplary embodiment, the present disclosure is directed at an odor adsorbing pad for collecting animal waste, comprising non-woven biodegradable fibers wherein the fibers are coated or impregnated with micronutrients containing inorganic salts and trace metals. The micronutrients may be present at a level of between about 0.1% to about 25% by weight and again be configured to promote the growth of bacteria that are capable of metabolizing waste by aerobic respiration and/or anaerobic respiration. The pad will have an overall thickness and a surface configured for receipt of animal waste. The micronutrients may then be uniformly distributed across the surface and at a thickness that is about 1.0%-25.0% of the overall pad thickness.

In a third exemplary embodiment, the present disclosure relates to a method for controlling odor caused by the decomposition of animal waste. The method may include first supplying a substrate material having a surface and thickness and incorporating micronutrients into the substrate material, the micronutrients configured to promote the growth of bacteria wherein the bacteria are capable of metabolizing waste by aerobic respiration and/or anaerobic respiration. This may then be followed by packaging the substrate material to preserve the micronutrients, wherein the micronutrients are uniformly distributed across said pad surface and are present at a selected thickness in the substrate material.

In a fourth exemplary embodiment, the present disclosure relates to an odor adsorbing litter for collecting animal waste, comprising particulate coated or impregnated with micronutrients at a level of between about 0.1% to about 25% by weight. The micronutrients are again configured to promote the growth of bacteria that are capable of metabolizing waste by aerobic respiration and/or anaerobic respiration.

DETAILED DESCRIPTION

The anaerobic decomposition of organic waste may produce gases having an unpleasant odor ("rotten egg smell"), etc., which may be attributed to the formation of hydrogen sulfide ($H_2S$). However, the addition of macro- and micronutrients may increase the population of those micro-organisms (facultative bacteria) that will otherwise metabolize such waste, thereby reducing the ability of such waste to decompose. Facultative bacteria may be understood as bacteria that are capable of metabolizing waste (feces/urine) by aerobic respiration if oxygen is present and/or by anaerobic respiration in the absence of oxygen (fermentation). Furthermore, it has been found that rather than simply including bacteria (by increasing their relative population numbers) in an attempt to reduce or mask odors, the use of micronutrients may more efficiently stimulate the growth of facultative bacteria found in waste products and more effectively control odor. Such micronutrients may also be all natural, relatively non-toxic and biodegradable.

Sources of micronutrients may include a variety of components. For example, the micronutrients may include inorganic salts, including but not limited to ferric chloride, ferrous chloride, calcium chloride, ammonium molybdate, nickel chloride, copper sulfate, cobalt chloride and zinc sulfate. In addition, trace metals may be employed in a given nutrient composition. The major trace elements may include iron, magnesium, calcium, copper, zinc, nickel, cobalt, molybdenum, selenium and tungsten. In addition, the micronutrients may include amino acids (e.g., glucose, xylose, cellobiose, and other various protein amino acids) that also may promote facultative bacteria growth.

The aforementioned micronutrients may be added to the absorptive waste pad at selected concentrations, as may be necessary, to stimulate the bacteria and reduce the potential for odor production. For example, the micronutrients may be incorporated in the waste pad (see below) at a concentration of between 1-25% (wt) including all values and increments therein. In such configuration, the micronutrients may be incorporated into the waste pad substrate which therefore avoids the need to add such nutrients as an entirely separate (e.g. after-market) operation. Furthermore, the pad may be packaged so that the nutrients are preserved for a given shelf-life requirement (e.g. air-tight polymer film packaging or packaging that avoids UV decomposition over a period of about 6-12 months). In addition, by providing a pad, e.g., wherein the micronutrients are coated and/or incorporated throughout the pad substrate material, a more efficient distribution of the micronutrients may be ensured. In addition, for a given quantity of micronutrients, a maximum surface area may be achieved, thereby avoiding the possibility of having an unbalanced distribution of micronutrients in the pad, which may lead to a relatively less efficient ability to control odor formation.

Expanding upon the above, it is contemplated herein that with respect to a given surface area of a pad, the micronutrients herein are uniformly distributed across the surface area, thereby providing that all regions of the pad, capable of receiving animal waste, contain micronutrients which can relatively more quickly respond and promote beneficial bacteria growth. In addition, it is contemplated that the micronutrients may be incorporated uniformly across a given surface area, and at a controlled depth, which again may ensure improved performance. For example, the micronutrient formulation herein may be distributed across the entire surface area capable of receiving waste, and at a thickness of between 0.1-5.0 cm, including all values and increments therein. In this manner, the micronutrients may be more effectively concentrated where needed for odor control management. The pad thickness may be, e.g., about 25 centimeters, so it may be appreciated that the nutrients may be selectively located at about 20% of the depth of such pad substrate. Accordingly, for any given pad, the micronutrients may be uniformly distributed across the pad surface, and at thicknesses of about 1-25% of the entire thickness of the pad so employed, including all values and increments therein.

The micronutrients may be dispersed in an appropriate liquid and applied to the surface of the pad, which may therefore include a non-woven substrate, which may therefore be utilized as an absorbent pad for animal waste. Such micronutrients may also be applied to the individual fibers after they have been formed and before they are converted into a non-woven pad by such processes as, for instance, needle punching, spunbonding, spunlacing, melt bonding and stitch bonding. The fibers, which may form the absorbent pad, may include, but not be limited to, natural and synthetic fibers, and combinations thereof.

In particular, the fibers themselves may be selected from biodegradable type polymeric resins, where reference to biodegradable is reference to polymer structure that may be susceptible to environmental decomposition process such as hydrolysis, UV degradation, etc. In addition, reference to biodegradable polymer is reference to the feature that the polymer may break-down when exposed to microorganisms, such as bacteria, fungi and algae, where an ingredient such as cornstarch and/or vegetable oil may be added to the polymer to achieve such result.

Those natural polymers contemplated herein as suitable therefore include polysaccharides, such as starch and/or cellulosics. In addition, the biodegradable polymer substrate may be formed from naturally occurring polymers such as proteins (e.g. gelatin, casein, silk and/or wool). Other suitable naturally occurring biodegradable polymers may include polyesters, such as the polyhydroxyalkanoates.

In addition, there are a number of biodegradable synthetic resins contemplated herein. Such synthetic biodegradable resins may include polyalkylene esters, polylactic acid and its copolymers, polyamide esters, polyvinyl esters, polyvinyl alcohol and/or polyanhydrides. A given biodegradable resin may be selected, depending upon its biodegradation as well as its ability to absorb and retain the micronutrients noted herein.

As may be appreciated, when the biodegradable pad herein, containing the indicated micronutrients, is placed in a sewage treatment system (such as a septic tank environment) such pad may not interfere with the process already occurring therein that deal with waste control management. In addition, those micronutrients that may not have been directed utilized in the pad may beneficially contribute to the sewage treatment system into which they may be introduced.

In addition to the use of the micronutrients herein, as the primary source to combat odor development of animal waste, it may be appreciated that the pad may also include other ingredients designed to synergistically contribute to odor management. For example, the pad may include chemical additives that may be designed to neutralize odor, which therefore contemplates the use of activated charcoal or other substrate materials that have relatively high surface areas per given mass of material. The level of such activated charcoal may be between about 0.1-10.0 percent by weight, including all values and increments therein. Accordingly, one may include activated carbon powder which may provide granules less than 1.0 mm in size or granulated activated charcoal which may provide granules of greater than 1.0 mm. In addition, one may utilize the biodegradable polymers noted herein, coated with carbon.

In addition, the pad may include a particular fragrance or other additive that may initially mask a given odor problem. For example, the pad may contain 0.1-5.0% by weight of a fragrance to mask odor. While more temporary, the advantage of some initial fragrance may provide some opportunity for the micronutrients noted above to promote the indicated beneficial bacterial growth, thereby providing an incubation period for the micronutrients to function in the manner described herein.

The present disclosure also contemplates the use of litter that directly incorporates the aforementioned nutrients which may similarly avoid the need to separately treat the litter when employed by a consumer, which as noted may lead to non-uniform distribution of the nutrients in the litter material. Litter may be understood herein as particulate, including biodegradable particulate, that may have a size (diameter) of between about 0.01 inches to about 0.50 inches, including all values and increments therein. Accordingly, the animal litter may be formulated to include the micronutrients to again reduce the production of undesirable odors from animal wastes. The litter may comprise a plurality of granules, generally formed from such materials as clays, earth, vermiculite, silica, corn starch and cellulose, which may also be coated with swelling agents. In addition, the animal litter may, in a manner analogous to the pad, include chemical additives to neutralize odor (e.g. activated charcoal) and/or a fragrance.

In the present disclosure, sources of micronutrients may be dispersed in a solution and applied to the surface of the litter granules, during the process of manufacture of the granules, which may then be used as an absorbent for animal waste.

Such micronutrients may therefore be applied to the litter granules by, for instance, by spray coating.

In addition, similar to the use of the micronutrients in a pad, the litter herein may be coated and/or impregnated with the aforementioned micronutrients at a level of about 0.1% to about 25.0%, including all values and increments therein. In addition, in the case of impregnation, the litter particles may have a diameter (e.g., longest linear cross-section through the particle) and the micronutrients may be impregnated into the surface of the particles at a thickness of about 1.0% to 25.0% of the particle diameter, including all values and increments therein. For example, in the case of a litter particle having a diameter of about 0.635 cm (0.25"), the micronutrients may be impregnated up to about 0.16 cm from the particle surface. This would amount to impregnation of about 25.2% of the overall particle diameter, i.e. 0.16 cm/0.635 cm=0.252.

To form the pad herein, a plastic (polymeric) liner or backing sheet of fluid impervious material may be supplied, which may control leakage or flow-through of urine waste or other liquid waste components. Such polymeric liner may include natural rubber material, based upon a diene type polymer reins, for example cis and/or trans polyisoprene. In addition, the pad may include a non-skid layer, providing relatively high friction, to ensure positioning at a given location.

What is claimed is:

1. An odor adsorbing pad for collecting animal waste, comprising fibers coated or impregnated with micronutrients at a level of between about 0.1% to about 25% by weight, wherein said micronutrients are configured to promote the growth of bacteria that are capable of metabolizing waste by aerobic respiration and/or anaerobic respiration wherein said pad has a thickness and a surface for receipt of animal waste, wherein said micronutrients are uniformly distributed across said surface and at a thickness of about 1.0%-25.0% of said pad thickness.

2. The odor absorbing pad of claim 1 wherein said fibers comprise a polymeric fiber capable of hydrolysis or ultraviolet degradation.

3. The odor absorbing pad of claim 1 including activated charcoal at a level of about 0.1-10 percent by weight.

4. The odor absorbing pad of claim 1 wherein said pad includes a fragrance at a level of about 0.1-5.0 percent by weight.

5. The odor absorbing pad of claim 1 wherein said pad includes a polymeric backing liner configured to control leakage or flow-through of fluids.

6. The odor absorbing pad of claim 1 wherein said micronutrients comprise one or more of an inorganic salt and one or more of a trace metal.

7. The odor absorbing pad of claim 6 wherein said inorganic salts-comprise one or more of ferric chloride, ferrous chloride, calcium chloride, ammonium chloride, nickel chloride, copper sulfate, cobalt chloride or zinc sulfate.

8. The odor absorbing pad of claim 6 wherein said trace metal comprises one or more of iron, magnesium, calcium, copper, zinc, nickel, cobalt, molybdenum, selenium or tungsten.

9. An odor adsorbing pad for collecting animal waste, comprising non-woven biodegradable fibers wherein said fibers are coated or impregnated with micronutrients containing one or more inorganic salts and one or more trace metals, said micronutrients present at a level of between about 0.1% to about 25% by weight, wherein said micronutrients are configured to promote the growth of bacteria that are capable of metabolizing waste by aerobic respiration and/or anaerobic respiration; wherein said pad has a thickness and a surface for receipt of animal waste, wherein said micronutrients are uniformly distributed across said surface and at a thickness of about 1-25% of said pad thickness.

10. The odor absorbing pad of claim 9 wherein said fibers comprise a polymeric fiber capable of hydrolysis or ultraviolet degradation.

11. The odor absorbing pad of claim 9 wherein said fibers comprise one or more of a polysaccharide, a protein and a polyester.

12. The odor absorbing pad of claim 9 wherein said fibers comprise one or more of a polyalkylene esters, polylactic acid and its copolymers, polyamide esters, polyvinyl alcohol and/or a polyanhyrdride.

13. The odor absorbing pad of claim 9 wherein said one or more inorganic salts comprise one or more of ferric chloride, ferrous chloride, calcium chloride, ammonium chloride, nickel chloride, copper sulfate, cobalt chloride or zinc sulfate.

14. The odor absorbing pad of claim 9 wherein said one or more trace metal comprises one or more of iron, magnesium, calcium, copper, zinc, nickel, cobalt, molybdenum, selenium or tungsten.

15. The odor absorbing pad of claim 9 including activated charcoal at a level of about 0.1-10 percent by weight.

16. A method for controlling odor caused by the decomposition of animal waste comprising:
supplying a substrate material having a surface and thickness;
incorporating micronutrients into said substrate material, said micronutrients configured to promote the growth of bacteria wherein said bacteria are capable of metabolizing waste by aerobic respiration and/or anaerobic respiration;
packaging said substrate material to preserve said micronutrients; wherein said micronutrients are uniformly distributed across said pad surface and are present at a selected thickness in said substrate material wherein said pad has a thickness and a surface for receipt of animal waste, wherein said micronutrients are uniformly distributed across said surface and at a thickness of about 1.0%-25.0% of said pad thickness.

17. An odor adsorbing litter for collecting animal waste, comprising particulate coated or impregnated with micronutrients at a level of between about 0.1% to about 25% by weight, wherein said micronutrients are configured to promote the growth of bacteria that are capable of metabolizing waste by aerobic respiration and/or anaerobic respiration wherein said particulate has a diameter and a surface for receipt of animal waste, wherein said micronutrients are uniformly distributed across said surface and at a thickness of about 1.0%-25.0% of said particulate diameter.

18. The litter of claim 17, wherein said particulate has a diameter and a surface for receipt of animal waste, wherein said micronutrients are impregnated at a thickness of about 1.0%-25.0% of said particle diameter.

19. The litter of claim 17 wherein said micronutrients comprise one or more of an inorganic salt and a trace metal.

* * * * *